(12) United States Patent
Ranjan et al.

(10) Patent No.: US 11,636,328 B2
(45) Date of Patent: Apr. 25, 2023

(54) L2 CONSTRAINED SOFTMAX LOSS FOR DISCRIMINATIVE FACE VERIFICATION

(71) Applicant: UNIVERSITY OF MARYLAND, COLLEGE PARK, College Park, MD (US)

(72) Inventors: Rajeev Ranjan, College Park, MD (US); Carlos Castillo, Silver Spring, MD (US); Ramalingam Chellappa, Potomac, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 1329 days.

(21) Appl. No.: 15/938,898

(22) Filed: Mar. 28, 2018

(65) Prior Publication Data
US 2019/0303754 A1    Oct. 3, 2019

(51) Int. Cl.
*G06N 3/08* (2006.01)
*G06F 17/11* (2006.01)
*G06N 5/046* (2023.01)
*G06K 9/62* (2022.01)
*G06V 40/16* (2022.01)

(52) U.S. Cl.
CPC .............. *G06N 3/08* (2013.01); *G06F 17/11* (2013.01); *G06K 9/627* (2013.01); *G06N 5/046* (2013.01); *G06V 40/172* (2022.01)

(58) Field of Classification Search
CPC ........ G06N 3/08; G06N 5/046; G06N 3/0454; G06N 3/084; G06F 17/11; G06K 9/627; G06K 9/6274; G06V 40/172; G06V 10/454; G06V 10/82

USPC ......................................................... 706/15
See application file for complete search history.

(56) References Cited

FOREIGN PATENT DOCUMENTS

WO    2017/015390 A1    1/2017

OTHER PUBLICATIONS

Ranjan, "Improving Network Robustness against Adversarial Attacks with Compact Convolution" Arxiv Mar. 22, 2018 (Year: 2018).*
Parde, "Deep convolutional neural network features and the original image." arXiv preprint arXiv: 1611.01751, 2016 (Year: 2016).*
Gua, "Recent Advances in Convolutional Neural Networks", ArXiv Oct. 19, 2017 (Year: 2017).*
Chen, "Unconstrained Face Verification using Deep CNN Features" Mar. 2, 2016. (Year: 2016).*
Sankaranarayanan. "Triplet Probabilistic Embedding for Face Verification and Clustering", Jan. 18, 2017 (Year: 2017).*
(Continued)

*Primary Examiner* — Juan A Torres
(74) *Attorney, Agent, or Firm* — Squire Patton Boggs (US) LLP

(57) ABSTRACT

Various face discrimination systems may benefit from techniques for providing increased accuracy. For example, certain discriminative face verification systems can benefit from $L_2$-constrained softmax loss. A method can include applying an image of a face as an input to a deep convolutional neural network. The method can also include applying an output of a fully connected layer of the deep convolutional neural network to an $L_2$-normalizing layer. The method can further include determining softmax loss based on an output of the $L_2$-normalizing layer.

12 Claims, 10 Drawing Sheets

(56) References Cited

OTHER PUBLICATIONS

Ranjan, "An All-In-One Convolutional Neural Network for Face Analysis" Nov. 3, 2016 (Year: 2016).*
Chen, "An end-to-end system for unconstrained face verification with deep convolutional neural networks", IEEE 2015 (Year: 2015).*
Ranjan, "L2-constrained Softmax Loss for Discriminative Face Verification", Mar. 28, 2017. (Year: 2017).*
Zhang, Solving large scale linear prediction problems using stochastic gradient descent algorithms, in: Proceedings of the International Conference on Machine Learning (ICML), 2004 (Year: 2004).*
Wen, "A discriminative feature learning approach for deep face recognition". In European Conference on Computer Vision, pp. 499-515. Springer, 2016 (Year: 2016).*
Parkhi, "Deep face recognition." In BMVC, vol. 1, p. 6, 2015 (Year: 2015).*
Schroff, "Facenet: A unified embedding for face recognition and clustering". In Proc. CVPR, 2015 (Year: 2015).*
Weiyang Liu et al., "SphereFace: Deep Hypersphere Embedding for Face Recognition", http://megaface.cs.washington.edu/results/facescrubresults.html#verification, 9 pages.

* cited by examiner (1)

L2 CONSTRAINED SOFTMAX LOSS FOR DISCRIMINATIVE FACE VERIFICATION

GOVERNMENT LICENSE RIGHTS

This invention was made with government support under 201414071600012 awarded by IARPA. The government has certain rights in the invention.

BACKGROUND

Field

Various face discrimination systems may benefit from techniques for providing increased accuracy. For example, certain discriminative face verification systems can benefit from $L_2$-constrained softmax loss.

Description of the Related Art

In recent years, the performance of face verification systems has significantly improved using deep convolutional neural networks (DCNNs). A typical pipeline for face verification includes training a deep network for subject classification with softmax loss, using the penultimate layer output as the feature descriptor, and generating a cosine similarity score given a pair of face images. The softmax loss function does not optimize the features to have higher similarity score for positive pairs and lower similarity score for negative pairs, which leads to a performance gap.

Face verification in unconstrained settings is a challenge. Despite the excellent performance of recent face verification systems on curated datasets like Labeled Faces in the Wild (LFW), it is still difficult to achieve similar accuracy on faces with extreme variations in viewpoints, resolution, occlusion and image quality. This is evident from the performance of the traditional algorithms on the publicly available IJB-A dataset. Data quality imbalance in the training set is one of the reason for this performance gap. Existing face recognition training datasets contain large amount of high quality and frontal faces, whereas the unconstrained and difficult faces occur rarely. Most of the DCNN-based methods trained with softmax loss for classification tend to over-fit to the high quality data and fail to correctly classify faces acquired in difficult conditions. Using softmax loss function for training face verification system has its own pros and cons. On the one hand, it can be easily implemented using inbuilt functions from the publicly available deep leaning toolboxes such as Caffe, Torch, and TensorFlow. Unlike triplet loss, it does not have any restrictions on the input batch size and converges quickly. The learned features are discriminative enough for efficient face verification without any metric learning.

On the other hand, the softmax loss is biased to the sample distribution. Unlike contrastive loss and triplet loss, which specifically attend to hard samples, the softmax loss maximizes the conditional probability of all the samples in a given mini-batch. Hence, it fits well to the high quality faces, ignoring the rare difficult faces from a training mini-batch. Moreover, the softmax loss does not optimize the verification requirement of keeping positive pairs closer and negative pairs far from each other. Due to this reason, many methods either apply metric learning on top of softmax features or train an auxiliary loss along with the softmax loss to achieve better verification performance.

SUMMARY

According to certain embodiments, a method can include applying an image of a face as an input to a deep convolutional neural network. The method can also include applying an output of a fully connected layer of the deep convolutional neural network to an $L_2$-normalizing layer. The method can further include determining softmax loss based on an output of the $L_2$-normalizing layer.

In certain embodiments, a training network can include an input configured to receive an image of a face. The training network can also include a deep convolutional neural network configured to train based on the image, and including a fully connected layer at an output of the deep convolutional neural network. The training network can further include an L2-normalizing layer at an output of the fully connected layer.

A testing neural network can, according to certain embodiments, include a deep convolutional neural network trained according to a process. The process can include applying an output of a fully connected layer of the deep convolutional neural network to an $L_2$-normalizing layer. The process can also include determining softmax loss based on an output of the $L_2$-normalizing layer.

BRIEF DESCRIPTION OF THE DRAWINGS

For proper understanding of the invention, reference should be made to the accompanying drawings, wherein.

DETAILED DESCRIPTION

Figure 1:
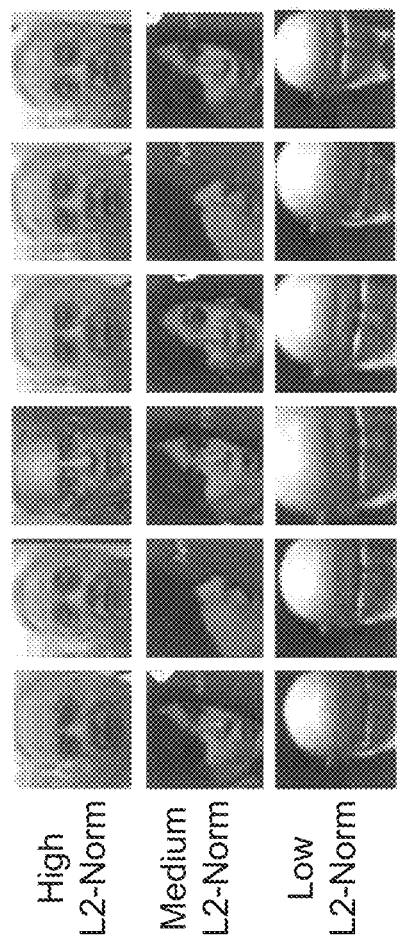
FIG. 1 illustrates various sets of face images with differing $L_2$-norms.

The $L_2$-norm of features learned using softmax loss is informative of the quality of the face. The $L_2$ norm can also be referred to as a Euclidean norm. Features for good quality frontal faces have a high $L_2$-norm while blurry faces with extreme pose have low $L_2$-norm (see FIG. 1). FIG. 1 illustrates various sets of face images with differing $L_2$-norms.

In recent years, the performance of face verification systems has significantly improved using deep convolutional neural networks (DCNNs). A typical pipeline for face verification includes training a deep network for subject classification with softmax loss, using the penultimate layer output as the feature descriptor, and generating a cosine similarity score given a pair of face images. The softmax loss function does not optimize the features to have higher similarity score for positive pairs and lower similarity score for negative pairs, which leads to a performance gap. Certain embodiments add an $L_2$-constraint to the feature descriptors, which restricts them to lie on a hypersphere of a fixed radius. This module can be implemented with existing deep learning frameworks, and may also be suitable for other deep learning frameworks. Integrating this step in the training pipeline significantly boosts the performance of face verification, thereby solving an important technical challenge and improving the performance of the underlying computer system. Specifically, certain embodiments can achieve state-of-the-art results on the challenging IJB-A dataset, achieving True Accept Rates of 0.863 and 0.910 at False Accept Rates 0.0001 and 0.001 respectively on the face verification protocol.

Certain embodiments of the present invention address issues associated with the softmax loss. More particularly, certain embodiments feature an $L_2$-softmax loss aspect that adds a constraint on the features during training such that their $L_2$-norm remain constant. In other words, the features can be forced to lie on a hypersphere of a fixed radius. The $L_2$-softmax loss of certain embodiments has a dual advantage. Firstly, it provides similar attention to both good and bad quality faces, since all the features have the same $L_2$-norm now. This similar attention can provide for better performance in unconstrained settings. Secondly, it strengthens the verification signal by forcing the same subject features to be closer and different subject features to be far from each other in the normalized space. Thus, it maximizes the margin for the normalized $L_2$ distance or cosine similarity score between negative and positive pairs. Thus, it overcomes the main disadvantages of the regular softmax loss.

The $L_2$-softmax loss also retains the advantages of the regular softmax loss. Similar to the softmax loss, it is a one network, one loss system. It does not necessarily require any joint supervision. It can be implemented using inbuilt functions from Caffe, Torch, and Tensor-Flow, and converges very fast. It introduces just a single scaling parameter to the network. Compared to regular softmax loss, $L_2$-softmax loss gains a significant boost in performance. It achieves new state-of-the-art results on IJB-A dataset, and competing results on LFW and YouTube Face datasets. It surpasses the performance of several state-of-the-art systems, which use multiple networks or multiple loss functions or both. In summary, certain embodiments address the following aspects.

Certain embodiments provide a simple, novel and effective $L_2$-softmax loss for face verification that restricts the $L_2$-norm of the feature descriptor to a constant value a. Certain embodiments provide for control of performance with respect to the scaling parameter α and provide suitable bounds on the value of a for achieving consistently high performance. Certain embodiments can yield a consistent and significant boost on all the three challenging face verification datasets namely LFW, YouTube Face, and IJB-A.

Moreover, the gains from $L_2$-softmax loss are complementary to metric learning (for example, TPE, joint-Bayes) or auxiliary loss functions (for example, center loss, contrastive loss). We show that applying these techniques on top of the $L_2$-softmax loss can further improve the verification performance. Combining with TPE, $L_2$-softmax loss achieves a record True Accept Rate (TAR) of 0.863 at False Accept Rate (FAR) of 0.0001 on the challenging IJB-A dataset.

Figure 2:
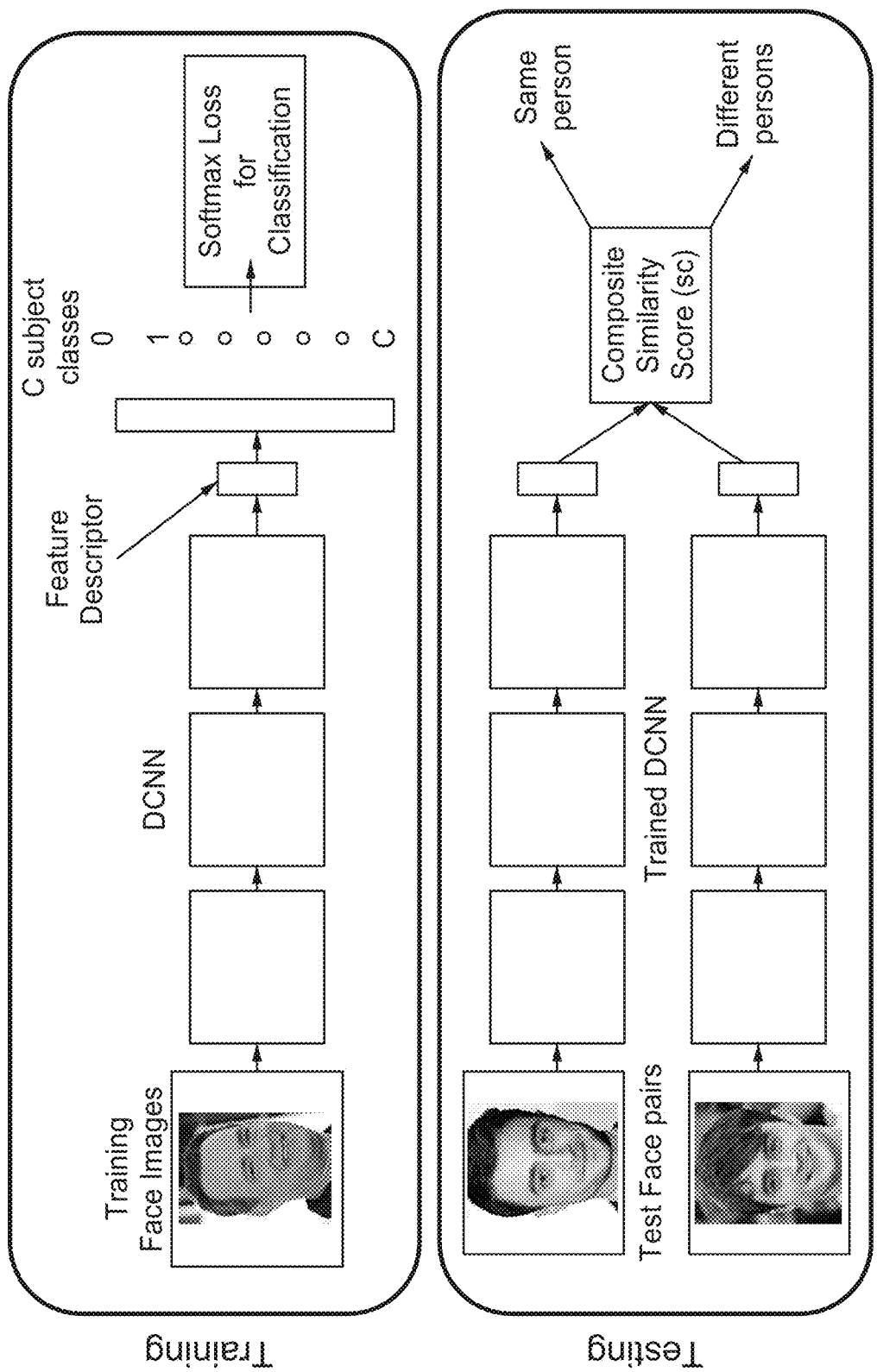
FIG. 2 illustrates a general pipeline for training a face verification system using DCNN.

FIG. 2 illustrates a general pipeline for training a face verification system using DCNN. Given a training dataset with face images and corresponding identity labels, a DCNN is trained as a classification task, in which the network learns to classify a given face image to its correct identity label. A softmax loss function is used for training the network, given by Equation 1:

$$L_S = -\frac{1}{M}\sum_{i=1}^{M} \log \frac{e^{W_{y_i}^T f(x_i)+b_{y_i}}}{\sum_{j=1}^{C} e^{W_j^T f(x_i)+b_j}}$$

where M is the training batch size, $x_i$ is the $i^{th}$ input face image in the batch, $f(x_i)$ is the corresponding output of the penultimate layer of the DCNN, $y_i$ is the corresponding class label, and W and b are the weights and bias for the last layer of the network, which acts as a classifier.

At test time, feature descriptors $f(x_g)$ and $f(x_p)$ can be extracted for the pair of test face images $x_g$ and $x_p$ respectively using the trained DCNN, and normalized to unit length. Then, a similarity score can be computed on the feature vectors, which can provide a measure of distance or how close the features lie in the embedded space. If the similarity score is greater than a set threshold, the face pairs can be decided to be of the same person. Usually, the similarity score can be computed as the $L_2$-distance between the normalized features or by using cosine similarity s, as given by Equation 2. Both these similarity measures may produce same results. Equation 2 is as follows:

$$s = \frac{f(x_g)^T f(x_p)}{\|f(x_g)\|_2 \|f(x_p)\|_2}$$

There are two major issues with this pipeline. First, the training and testing steps for face verification task are decoupled. Training with softmax loss does not necessarily ensure the positive pairs to be closer and the negative pairs to be far separated in the normalized or angular space.

Figure 3:
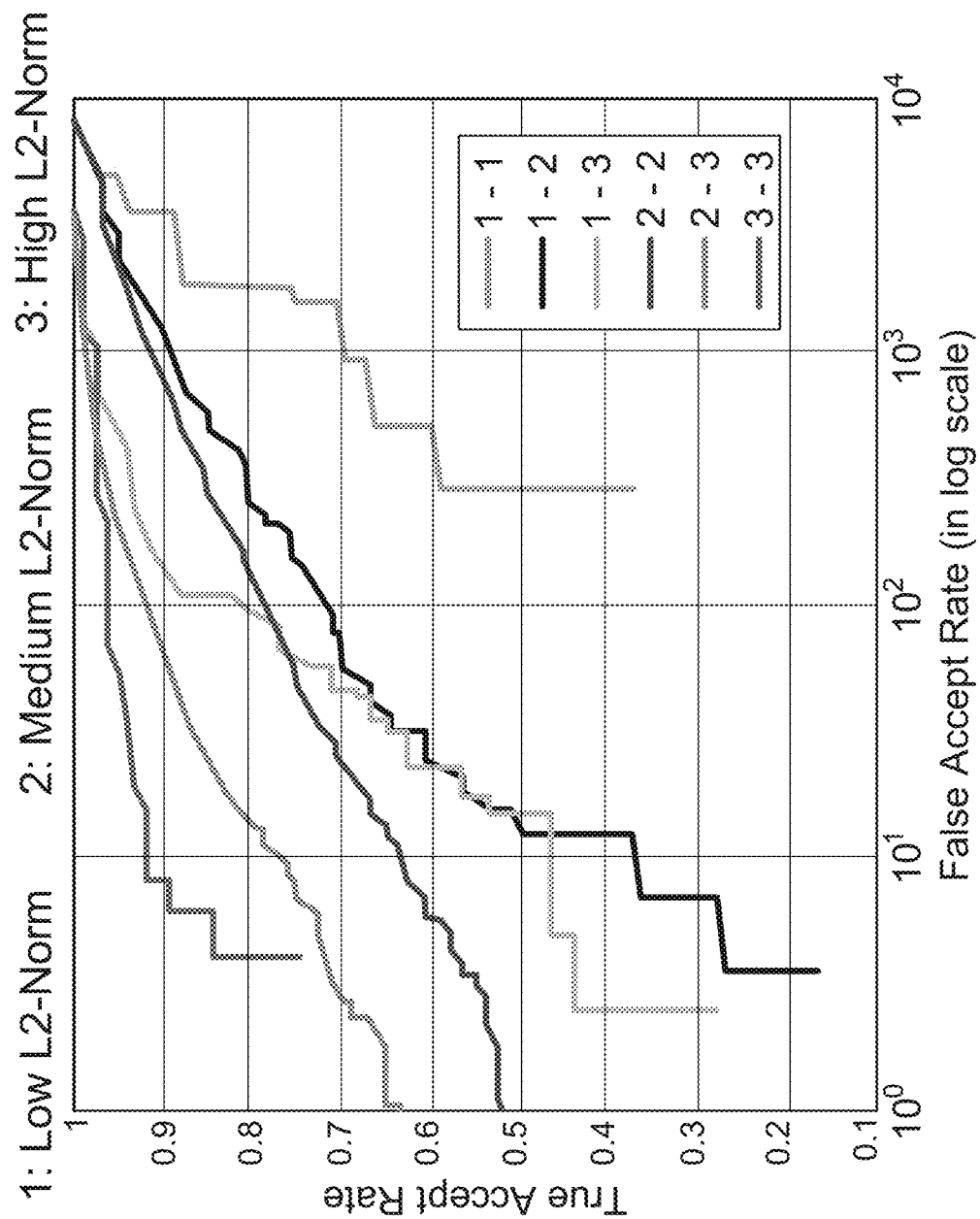
FIG. 3 shows the performance of six different sets for the IJB-A face verification protocol.

Secondly, the softmax classifier is weak in modeling difficult or extreme samples. In a typical training batch with data quality imbalance, the softmax loss gets minimized by increasing the $L_2$-norm of the features for easy samples, and ignoring the hard samples. The network thus learns to respond to the quality of the face by the $L_2$-norm of its feature descriptor. A simple experiment on the IJB-A dataset can be performed in which the templates (groups of images/frames of same subject) can be divided into three different sets based on the $L_2$-norm of their feature descriptors. The features can be computed using Face-Resnet trained with regular softmax loss. Templates with descriptors' $L_2$-norm<90 can be assigned to set1. The templates with $L_2$-norm>90 but<150 can be assigned to set2, while templates with $L_2$-norm>150 can be assigned to set3. In total they form six sets of evaluation pairs. FIG. 3 shows the performance of these six different sets for the IJB-A face verification protocol. Pairs having low $L_2$-norm for both the templates perform very poor, while the pairs with high $L_2$-norm perform the best. The difference in performance between each set is quite significant. FIG. 1 shows some sample templates from set1, set2 and set3, which confirm that the $L_2$-norm of the feature descriptor is informative of the quality of the descriptor.

To solve these issues, certain embodiments enforce the $L_2$-norm of the features to be fixed for every face image.

Specifically, certain embodiments add an $L_2$-constraint to the feature descriptor such that the descriptor lies on a hypersphere of a fixed radius. This approach has two advantages. Firstly, on a hypersphere, minimizing the softmax loss is equivalent to maximizing the cosine similarity for the positive pairs and minimizing it for the negative pairs, which strengthens the verification signal of the features. Secondly, the softmax loss is able to model the extreme and difficult faces better, since all the face features have same $L_2$-norm.

Certain embodiments of the present invention provide for $L_2$-softmax loss given as a minimization of Equation 3

$$L_{L_2S} = -\frac{1}{M}\sum_{i=1}^{M}\log\frac{e^{W_{y_i}^T f(x_i)+b_{y_i}}}{\sum_{j=1}^{C}e^{W_j^T f(x_i)+b_j}}$$

subject to $\|f(x_i)\|_2=\alpha$, $\forall i=1, 2, \ldots M$, where $x_i$ is the input image in a mini-batch of size M, $y_i$ is the corresponding class label, $f(x_i)$ is the feature descriptor obtained from the penultimate layer of DCNN, C is the number of subject classes, and W and b are the weights and bias for the last layer of the network which acts as a classifier. This equation adds an additional $L_2$-constraint to the regular softmax loss defined in Equation 1. The effectiveness of this constraint can be seen using MNIST data.

Using MNIST data, various differences between the features learned using the two setups discussed above can be seen. First, the intra-class angular variance is large when using the regular softmax loss, which can be estimated by the average width of the lobes for each class. On the other hand, the features obtained with L2-softmax loss have lower intra-class angular variability, and are represented by thinner lobes. Second, the magnitudes of the features are much higher with the softmax loss (ranging up to 150), since larger feature norms result in a higher probability for a correctly classified class. In contrast, the feature norm has minimal effect on the L2-softmax loss since every feature is normalized to a circle of fixed radius before computing the loss. Hence, the network focuses on bringing the features from the same class closer to each other and separating the features from different classes in the normalized or angular space. Table 1 lists the accuracy obtained with the two setups on MNIST test set. L2-softmax loss achieves a higher performance, reducing the error by more than 15%. Note that these accuracy numbers are lower compared to a typical DCNN since we are using only 2-dimensional features for classification.

There are various possible ways of implementing the L2-constraint described in Equation 3 in the framework of DCNNs. The constraint can be enforced by adding an L2-normalize layer followed by a scale layer as shown in FIG. 4.

Figure 4:
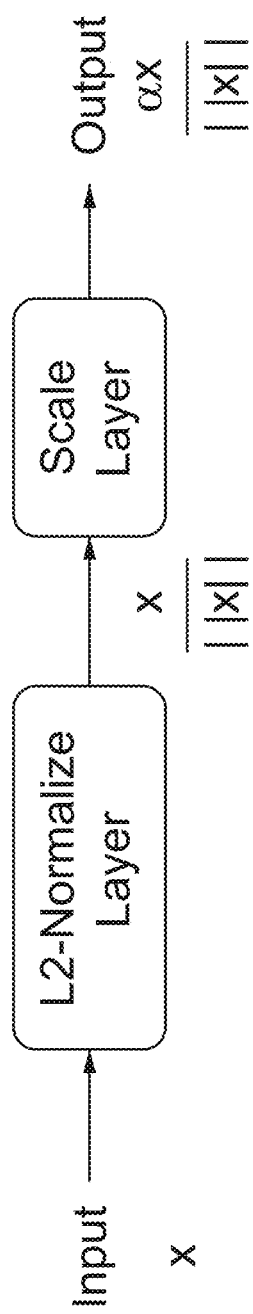
FIG. 4 illustrates the addition of an L2-normalize layer and a scale layer to constrain the feature descriptor to lie on a hypersphere of radius $\alpha$, according to certain embodiments.

FIG. 4 illustrates the addition of an L2-normalize layer and a scale layer to constrain the feature descriptor to lie on a hypersphere of radius $\alpha$, according to certain embodiments.

This module can be added just after the penultimate layer of a DCNN, which acts as a feature descriptor. The $L_2$-normalize layer can normalize the input feature x to a unit vector given by Equation 4. The scale layer can scale the input unit vector to a fixed radius given by the parameter $\alpha$ (Equation 5). In total, just one additional scalar parameter ($\alpha$) can be introduced, and this parameter can be trained along with the other parameters of the network.

Equation 4 is $$y = \frac{x}{\|x\|_2}$$

Equation 5 is $$z = \alpha \cdot y$$

The module can be fully differentiable and can be used in the end-to-end training of the network. At test time, the proposed module may be redundant, as the features may eventually be normalized to unit length while computing the cosine similarity. At training time, the gradients can be backpropagated through the L2-normalize and the scale layer, and the gradients can be computed with respect to the scaling parameter using the chain rule as given below in Equation 6:

$$\frac{\delta l}{\delta y_i} = \frac{\delta l}{\delta z_i} \cdot \alpha$$

$$\frac{\delta l}{\delta \alpha} = \sum_{j=1}^{D} \frac{\delta l}{\delta z_j} \cdot y_j$$

$$\frac{\delta l}{\delta x_i} = \sum_{j=1}^{D} \frac{\delta l}{\delta y_j} \cdot \frac{\delta y_j}{\delta x_i}$$

$$\frac{\delta y_i}{\delta x_i} = \frac{\|x\|_2^2 - x_i^2}{\|x\|_2^3}$$

$$\frac{\delta y_j}{\delta x_i} = \frac{-x_i \cdot x_j}{\|x\|_2^3}$$

The scaling parameter $\alpha$ can play a role in deciding the performance of $L_2$-softmax loss. There are at least two ways to enforce the $L_2$-constraint: 1) by keeping $\alpha$ fixed throughout the training, and 2) by letting the network learn the parameter $\alpha$. The second way is elegant and always improves over the regular softmax loss. Nevertheless, the parameter learned by the network is high, which results in a relaxed L2-constraint. The softmax classifier aimed at increasing the feature norm for minimizing the overall loss, increases the parameter $\alpha$ instead, allowing it more freedom to fit to the easy samples. Hence, $\alpha$ learned by the network can form an upper bound for the parameter. A better performance can be obtained by fixing to a lower constant value.

Figure 5:
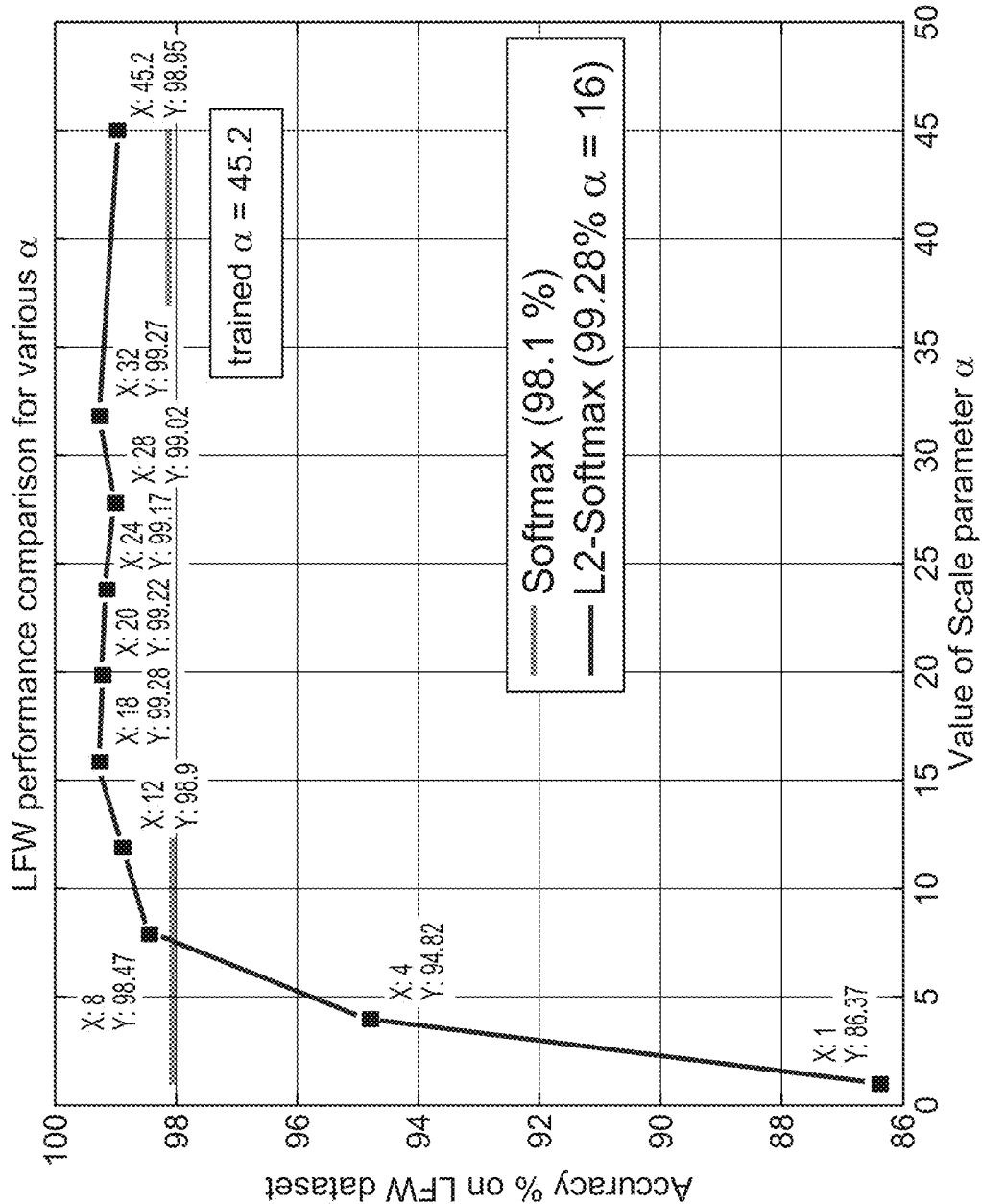
FIG. 5 illustrates LFW performance for various values of $\alpha$, according to certain embodiments.

On the other hand, with a very low value of $\alpha$, the training does not converge. For instance, $\alpha=1$ performs very poorly on the LFW dataset, achieving an accuracy of 86.37% (see FIG. 5). FIG. 5 illustrates LFW performance for various values of $\alpha$, according to certain embodiments. The reason is that a hypersphere with a small radius ($\alpha$) has limited surface area for embedding features from the same class together and those from different classes far from each other.

Figure 6:
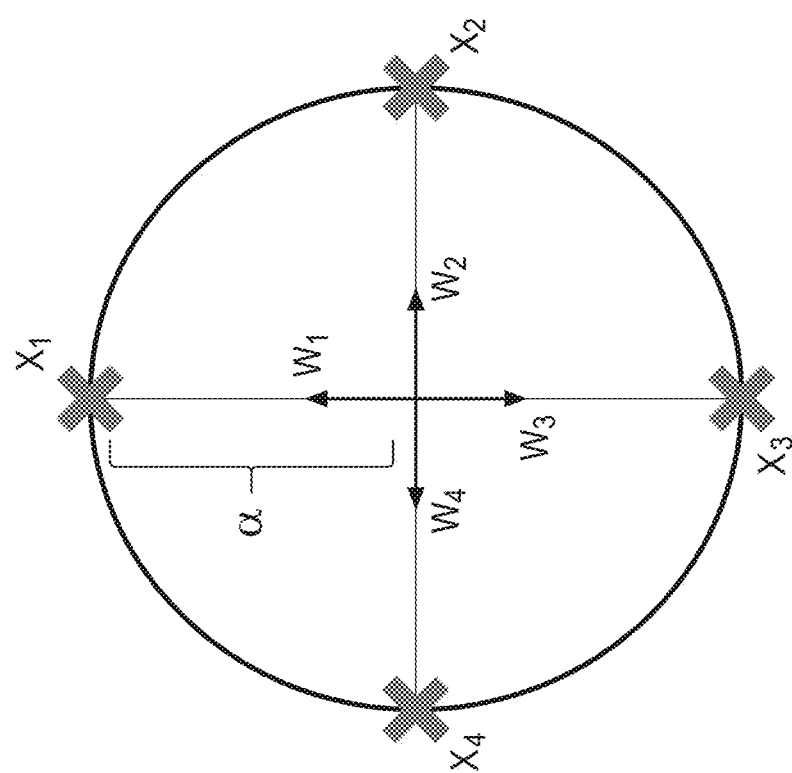
FIG. 6 illustrates a 2-D visualization of the assumed distribution of features, according to certain embodiments.

A theoretical lower bound on $\alpha$ can be formulated. Assuming the number of classes C to be lower than twice the feature dimension D, the classes can be distributed on a hypersphere of dimension D such that any two class centers are at least 90 degrees apart. FIG. 6 represents this case for C=4 class centers distributed on a circle of radius $\alpha$. The classifier weights ($W_i$) can be assumed to be a unit vector pointing in the direction of their respective class centers, and the bias term can be ignored. The average softmax probability p for correctly classifying a feature is given by Equation 7:

$$p = \frac{e^{W_i^T x_i}}{\sum_{j=1}^{4} e^{W_i^T x_i}} = \frac{e^\alpha}{e^\alpha + 2 + e^{-\alpha}}$$

Ignoring the term $e^{-\alpha}$ and generalizing it for C classes, the average probability becomes, as defined by Equation 8:

$$p = \frac{e^\alpha}{e^\alpha + C - 2}$$

Figure 7:
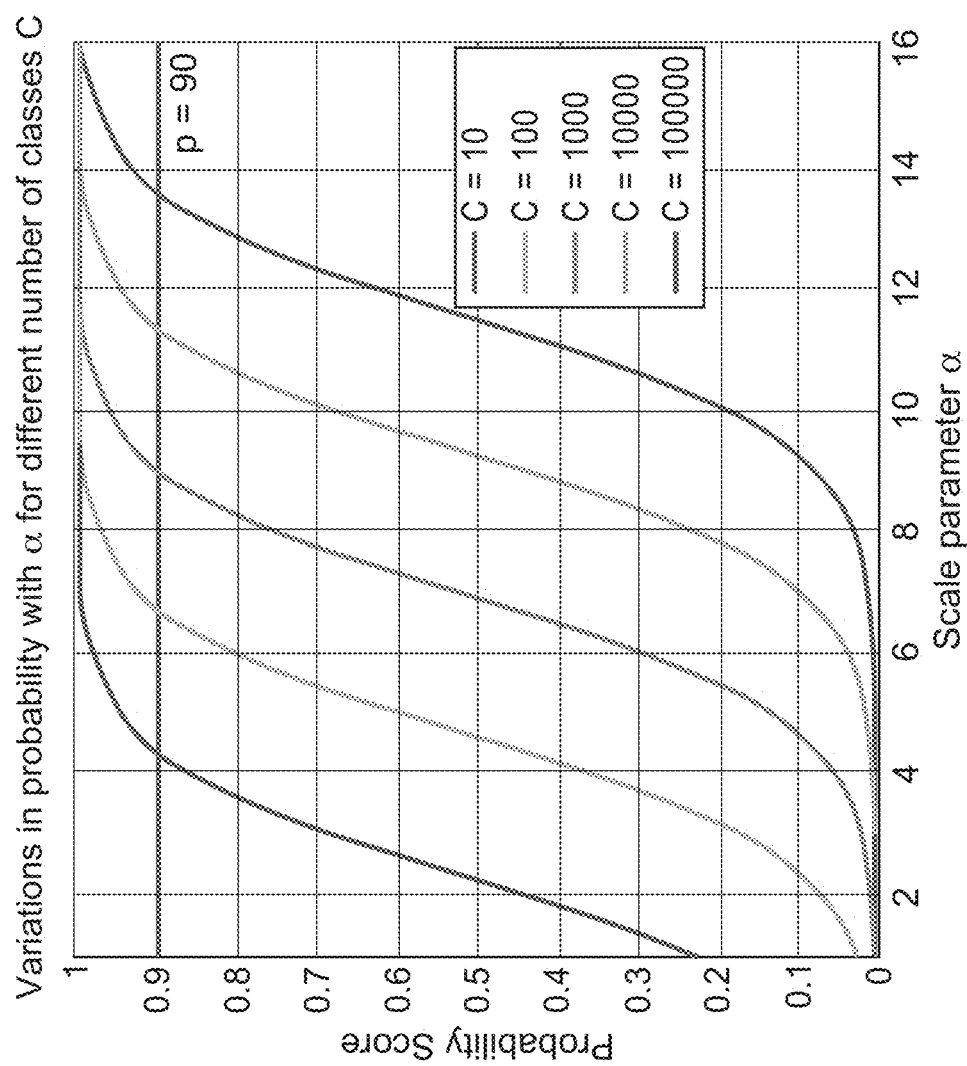
FIG. 7 illustrates variation in softmax probability with respect to $\alpha$ for different number of classes C, according to certain embodiments.

FIG. 6 illustrates a 2-D visualization of the assumed distribution of features, according to certain embodiments. FIG. 7 illustrates variation in softmax probability with respect to α for different number of classes C, according to certain embodiments.

FIG. 7 plots the probability score as a function of the parameter α for various number of classes C. To achieve a given classification probability (say p=0:9), a higher α may be needed for a larger C. Given the number of classes C for a dataset, the lower bound on α can be obtained to achieve a probability score of p by using Equation 9:

$$\alpha_{low} = \log \frac{p(C-2)}{1-p}$$

Figure 8:
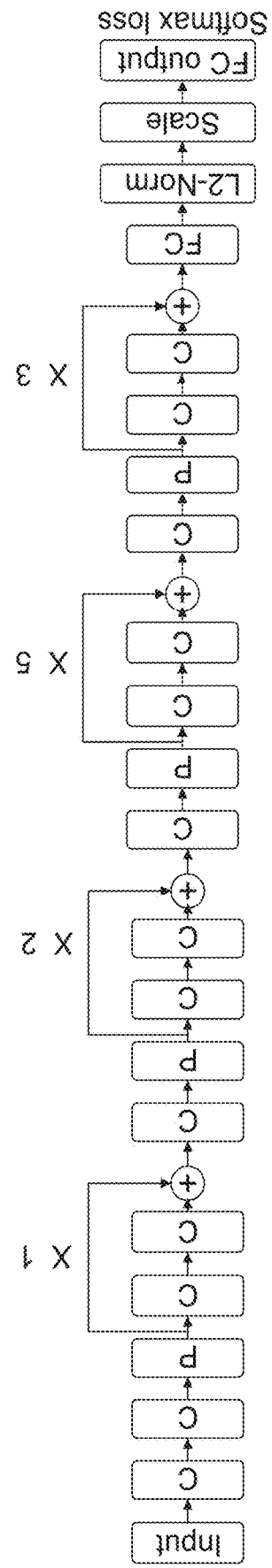
FIG. 8 illustrates a training neural network according to certain embodiments.

FIG. 8 illustrates a training neural network according to certain embodiments. As shown FIG. 8, the network can be based on a Face-Resnet architecture. C denotes a Convolution Layer followed by PReLU while P denotes a Max Pooling Layer. Each pooling layer can be followed by a set of residual connections, the count for which is denoted alongside. After the fully-connected layer (FC), an L2-Normalize layer and Scale Layer can be added, which can then be followed by the softmax loss as a fully connected output. This is an example of a training network, but the number of layers and exact architecture can be varied.

Figure 9:
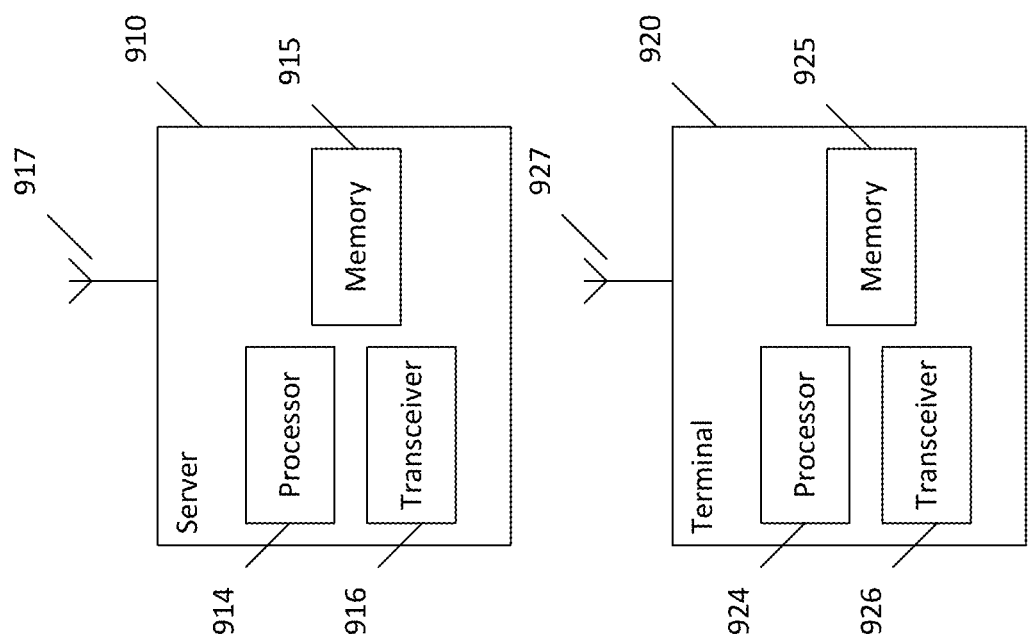
FIG. 9 illustrates a system according to certain embodiments.

FIG. 9 illustrates a system according to certain embodiments of the invention. It should be understood that each block of the flowchart of FIG. 10 may be implemented by various means or their combinations, such as hardware, software, firmware, one or more processors and/or circuitry. In one embodiment, a system may include several devices, such as, for example, server 910 and terminal 920. The system may include more than one terminal 920 and more than one server 910, although only one of each is shown for the purposes of illustration. A server can be an any computing system, including a distributed or cloud computing system. Each of these devices may include at least one processor or control unit or module, respectively indicated as 914 and 924. At least one memory may be provided in each device, and indicated as 915 and 925, respectively. The memory may include computer program instructions or computer code contained therein, for example for carrying out the embodiments described above. One or more transceiver 916 and 926 may be provided, and each device may also include an antenna, respectively illustrated as 917 and 927. Although only one antenna each is shown, many antennas and multiple antenna elements may be provided to each of the devices. Other configurations of these devices, for example, may be provided. For example, server 910 and terminal 920 may be additionally configured for wired communication, in addition to wireless communication, and in such a case antennas 917 and 927 may illustrate any form of communication hardware, without being limited to merely an antenna.

Transceivers 916 and 926 may each, independently, be a transmitter, a receiver, or both a transmitter and a receiver, or a unit or device that may be configured both for transmission and reception.

A user device or terminal 920 may be remote from the server 910 or integral therewith. In an exemplifying embodiment, an apparatus, such as a node, server, or terminal, may include means for carrying out embodiments described above in relation to FIG. 10.

Processors 914 and 924 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof. The term circuitry may refer to one or more electric or electronic circuits. The term processor may refer to circuitry, such as logic circuitry, that responds to and processes instructions that drive a computer.

For firmware or software, the implementation may include modules or units of at least one chip set (e.g., procedures, functions, and so on). Memories 915 and 925 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof. The memory may be fixed or removable.

The memory and the computer program instructions may be configured, with the processor for the particular device, to cause a hardware apparatus such as server 910 and/or terminal 920, to perform any of the processes described above (see, for example, FIG. 10). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 9 illustrates a system including a server 910 and a terminal 920, embodiments of the invention may be applicable to other configurations, and configurations involving additional elements, as illustrated and discussed herein. For example, multiple terminals and multiple servers may be present, or other nodes providing similar functionality.

The DCNNs mentioned herein can be implemented on the server 910 and/or terminal 920. Any desired computer mechanism for implementing the DCNNs is permitted.

Figure 10:
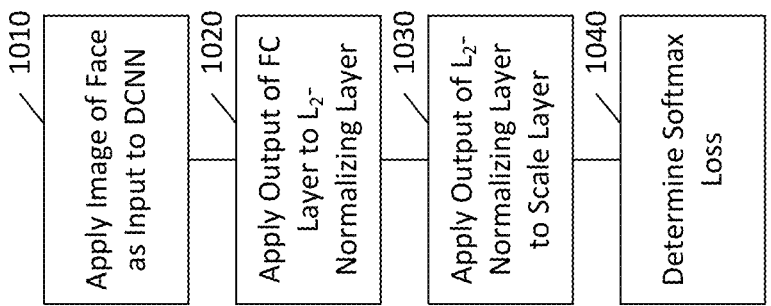
FIG. 10 illustrates a method according to certain embodiments.

FIG. 10 illustrates a method according to certain embodiments. As shown in FIG. 10, a method can include, at 1010, applying an image of a face as an input to a deep convolutional neural network. The method can also include, at 1020, applying an output of a fully connected layer of the deep convolutional neural network to an $L_2$-normalizing layer. The method can further include, at 1040, determining softmax loss based on an output of the $L_2$-normalizing layer.

The method can additionally include, at 1030, applying an output of the L2-normalizing layer to a scale layer. The determining can be based on an output of the scale layer.

Feature descriptors of the face can be restricted by the L2-normalizing layer to lie on a hypersphere of a fixed radius. Training the deep convolutional neural network can include minimizing $$L_{L_2S} = -\frac{1}{M}\sum_{i=1}^{M}\log\frac{e^{W_{y_i}^T f(x_i)+b_{y_i}}}{\sum_{j=1}^{C}e^{W_j^T f(x_i)+b_j}}$$

subject to $\|f(x_i)\|_2=\alpha$, $\forall i=1, 2, \ldots M$, where $x_i$ is an input image in a mini-batch of size M, $y_i$ is a corresponding class label, $f(x_i)$ is a feature descriptor obtained from a penultimate layer of DCNN, C is a number of subject classes, and W and b are weights and bias for the last layer of the network, which acts as a classifier.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
applying an image of a face as an input to a deep convolutional neural network;
applying an output of a fully connected layer of the deep convolutional neural network to an $L_2$-normalizing layer;
determining softmax loss based on an output of the $L_2$-normalizing layer; and
applying an output of the L2-normalizing layer to a scale layer.

2. The method of claim 1,
wherein the determining is based on an output of the scale layer.

3. The method of claim 1, wherein feature descriptors of the face are restricted by the L2-normalizing layer to lie on a hypersphere of a fixed radius.

4. The method of claim 1, wherein training the deep convolutional neural network comprises minimizing $$L_{L_2S} = -\frac{1}{M}\sum_{i=1}^{M}\log\frac{e^{W_{y_i}^T f(x_i)+b_{y_i}}}{\sum_{j=1}^{C}e^{W_j^T f(x_i)+b_j}}$$

subject to $\|f(x_i)\|_2=\alpha$, $\forall i=1,2, \ldots M$, where $x_i$ is an input image in a mini-batch of size M, $y_i$ is a corresponding class label, $f(x_i)$ is a feature descriptor obtained from a penultimate layer of DCNN, C is a number of subject classes, and W and b are weights and bias for the last layer of the network, which acts as a classifier.

5. A training network comprising:
an input configured to receive an image of a face;
a deep convolutional neural network configured to train based on the image, and including a fully connected layer at an output of the deep convolutional neural network;
an L2-normalizing layer at an output of the fully connected layer; and
a scale layer at an output of the L2-normalizing layer.

6. The training network of claim 5, wherein the deep convolutional neural network is trained with softmax loss.

7. The training network of claim 5, wherein feature descriptors of the face are restricted by the L2-normalizing layer to lie on a hypersphere of a fixed radius.

8. The training network of claim 5, wherein the training network is configured to minimize $$L_{L_2S} = -\frac{1}{M}\sum_{i=1}^{M}\log\frac{e^{W_{y_i}^T f(x_i)+b_{y_i}}}{\sum_{j=1}^{C}e^{W_j^T f(x_i)+b_j}}$$

subject to $\|f(x_i)\|_2=\alpha$, $\forall i=1,2, \ldots M$, where $x_i$ is an input image in a mini-batch of size M, $y_i$ is a corresponding class label, $f(x_i)$ is a feature descriptor obtained from a penultimate layer of DCNN, C is a number of subject classes, and W and b are weights and bias for the last layer of the network, which acts as a classifier.

9. A testing neural network, comprising:
a deep convolutional neural network trained according to a process, the process comprising
applying an output of a fully connected layer of the deep convolutional neural network to an $L_2$-normalizing layer;
determining softmax loss based on an output of the $L_2$-normalizing layer;
applying an output of the L2-normalizing layer to a scale layer.

10. The testing neural network of claim 9,
wherein the determining is based on an output of the scale layer.

11. The testing neural network of claim 9, wherein feature descriptors of the face are restricted by the L2-normalizing layer to lie on a hypersphere of a fixed radius.

12. The testing neural network of claim 9, wherein training the deep convolutional neural network comprises minimizing $$L_{L_2S} = -\frac{1}{M}\sum_{i=1}^{M}\log\frac{e^{W_{y_i}^T f(x_i)+b_{y_i}}}{\sum_{j=1}^{C}e^{W_j^T f(x_i)+b_j}} \qquad 5$$

subject to $\|f(x_i)\|_2 = \alpha$, $\forall i=1,2,\ldots M$, where $x_i$ is an input image in a mini-batch of size M, $y_i$ is a corresponding class label, $f(x_i)$ is a feature descriptor obtained from a penultimate layer of DCNN, C is a number of subject classes, and W and b are weights and bias for the last layer of the network, which acts as a classifier.

* * * * *